(12) United States Patent
Baughman et al.

(10) Patent No.: US 12,412,106 B2
(45) Date of Patent: Sep. 9, 2025

(54) IDENTIFYING RELATED MESSAGES IN A NATURAL LANGUAGE INTERACTION IN MULTIPLE ITERATIONS

(71) Applicant: International Business Machines Corporation, Armonk, NY (US)

(72) Inventors: Aaron K. Baughman, Cary, NC (US); Micah Forster, Round Rock, TX (US); Gray Franklin Cannon, Atlanta, GA (US); Mohit Trivedi, Dunwoody, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 999 days.

(21) Appl. No.: 17/368,102

(22) Filed: Jul. 6, 2021

(65) Prior Publication Data

US 2023/0011645 A1 Jan. 12, 2023

(51) Int. Cl.
*G06N 5/04* (2023.01)
*G06N 10/00* (2022.01)
*G06N 20/00* (2019.01)

(52) U.S. Cl.
CPC ............... *G06N 5/04* (2013.01); *G06N 10/00* (2019.01); *G06N 20/00* (2019.01)

(58) Field of Classification Search
CPC .............................. G06N 5/04; G06F 18/214
USPC ......................................................... 706/12
See application file for complete search history.

(56) References Cited

U.S. PATENT DOCUMENTS

| 8,190,553 | B2 | 5/2012 | Routt |
| 8,903,716 | B2 | 12/2014 | Chen et al. |
| 9,195,949 | B2 | 11/2015 | Kasabov |
| 9,270,385 | B2 | 2/2016 | Meyers et al. |

(Continued)

FOREIGN PATENT DOCUMENTS

| CA | 2883313 C | 6/2020 |
| JP | 2019-513249 A | 5/2019 |

(Continued)

OTHER PUBLICATIONS

Jung et al., An Information-Theoretic Approach to Personalized Explainable Machine Learning, IEEE Signal Processing Letters, vol. 27, pp. 825-829, Mar. 15, 2020.

(Continued)

*Primary Examiner* — Ruay Ho
(74) *Attorney, Agent, or Firm* — Garg Law Firm, PLLC; Rakesh Garg; Michael O'Keefe

(57) ABSTRACT

Using a classical data model executing on a classical processor, a set of classical features is scored. A score of a classical feature comprises an evaluation of a utility of the classical feature in predicting a result involving a resource. Using a quantum data model executing on a quantum processor and the scored set of classical features, a set of quantum features is scored. The quantum data model is executed a number of times previously determined using a set of results of executing the quantum data model on a set of annotated training data. The scored set of classical features and the scored set of quantum features are correlated, forming a combined set of scored features. Using the combined set of scored features and a first set of input data of a resource, a valuation of the resource is calculated.

20 Claims, 9 Drawing Sheets

(56) References Cited

U.S. PATENT DOCUMENTS

| | | | |
|---|---|---|---|
| 9,727,959 | B2 | 8/2017 | Meyers et al. |
| 10,318,966 | B2 | 6/2019 | Ettl et al. |
| 10,380,613 | B1 | 8/2019 | Liu |
| 10,452,989 | B2 | 10/2019 | Majumdar |
| 10,489,845 | B2 | 11/2019 | Mullakkara Azhuvath et al. |
| 10,572,890 | B2 | 2/2020 | Lederman et al. |
| 10,733,521 | B2 | 8/2020 | Levin |
| 10,796,271 | B2 | 10/2020 | Beach-Drummond |
| 11,010,436 | B1 | 5/2021 | Peng et al. |
| 11,132,422 | B2 * | 9/2021 | Chen ................. G06F 17/16 |
| 11,574,030 | B1 * | 2/2023 | Harrigan ............. G06N 10/20 |
| 11,580,438 | B1 | 2/2023 | McMahon et al. |
| 11,714,971 | B2 | 8/2023 | Wray et al. |
| 12,061,952 | B2 | 8/2024 | Baughman et al. |
| 2014/0156392 | A1 | 6/2014 | Ouimet et al. |
| 2015/0006443 | A1 | 1/2015 | Rose et al. |
| 2016/0321559 | A1 | 11/2016 | Rose et al. |
| 2017/0011465 | A1 | 1/2017 | Anastassov et al. |
| 2017/0109612 | A1 | 4/2017 | Mittal et al. |
| 2017/0228505 | A1 | 8/2017 | Allen et al. |
| 2017/0278181 | A1 | 9/2017 | Shah |
| 2019/0096526 | A1 * | 3/2019 | Hirsch ............. G06F 21/6245 |
| 2019/0138553 | A1 | 5/2019 | Maharajh et al. |
| 2020/0143910 | A1 | 5/2020 | Noori et al. |
| 2021/0019132 | A1 * | 1/2021 | Gambetta ............ G06N 10/80 |
| 2021/0065294 | A1 | 3/2021 | Trevathan et al. |
| 2021/0090154 | A1 | 3/2021 | Michaelson et al. |
| 2021/0125612 | A1 | 4/2021 | Coman et al. |
| 2021/0216629 | A1 * | 7/2021 | Miller ................. G06F 21/52 |
| 2021/0216631 | A1 * | 7/2021 | Child ................. G06F 21/564 |
| 2022/0253871 | A1 * | 8/2022 | Miller ................. G06F 40/30 |
| 2023/0010615 | A1 | 1/2023 | Baughman et al. |
| 2023/0023121 | A1 * | 1/2023 | Cao .................. G06F 18/214 |
| 2023/0419155 | A1 | 12/2023 | You et al. |
| 2024/0303518 | A1 | 9/2024 | Baughman et al. |

FOREIGN PATENT DOCUMENTS

| | | | |
|---|---|---|---|
| KR | 10-2018-0004226 A | 1/2018 | |
| WO | WO-2022043512 A1 * | 3/2022 | ........... G06F 18/214 |

OTHER PUBLICATIONS

Jain et al., Transforming Marketing With Artificial Intelligence, International Research Journal of Engineering and Technology (IRJET), vol. 7, Issue 7, pp. 3964-3974, Jul. 2020.

Huang et al., A Strategic Framework for Artificial Intelligence In Marketing, Journal of the Academy of Marketing Science, vol. 49, Issue 1, pp. 30-50, Nov. 4, 2020.

Tsukuda et al., DualDiv: Diversifying Items and Explanation Styles in Explainable Hybrid Recommendation, RecSys'19, pp. 398-402, Sep. 16-20, 2019.

Kouki et al., Generating and Understanding Personalized Explanations in Hybrid Recommender Systems, ACM Transactions on Interactive Intelligent Systems, vol. 10, No. 4, Article 31, pp. 1-40, Nov. 2020.

Golrezaei et al., Real-time optimization of personalized assortments, EC '13: Proceedings of the fourteenth ACM conference on Electronic commerce, Jun. 2013, pp. 561-562.

Song et al., Personalized optimization for android smartphones, ACM Transactions on Embedded Computing Systems, vol. 13, Issue 2s, Jan. 27, 2014, Article No. 60, pp. 1-25.

Dong et al., User action interpretation for personalized content optimization in recommender systems, CIKM '11: Proceedings of the 20th ACM international conference on Information and knowledge management, Oct. 24, 2011, pp. 2129-2132.

Allcock et al., Quantum Algorithms for Feedforward Neural Networks, ACM Transactions on Quantum Computing, vol. 1, Issue 1, Sep. 2020, Article No. 6, pp. 1-24.

Yarkoni et al., Quantum Shuttle: traffic navigation with Quantum computing, APEQS 2020: Proceedings of the 1st ACM SIGSOFT International Workshop on Architectures and Paradigms for Engineering Quantum Software, Nov. 13, 2020, pp. 22-30.

Guo et al., System and method for providing personalized advertisements to offline retailer users, 2017 8th IEEE International Conference on Software Engineering and Service Science (ICSESS), Nov. 24-26, 2017, https://ieeexplore.ieee.org/document/8343014.

Wingerath et al., Speed Kit: A Polyglot & GDPR-Compliant Approach for Caching Personalized Content, 2020 IEEE 36th International Conference on Data Engineering (ICDE), Apr. 20-24, 2020.

Kimbler et al., Value added mobile broadband services Innovation driven transformation of the 'smart pipe', 2012 16th International Conference on Intelligence in Next Generation Networks, Oct. 8-11, 2012.

Kato, A study on application of Artificial Intelligence (AI) for cosmetics: Quantum computer is necessary for Beauty-field analysis, 2018 International Conference on Electronics Packaging and iMAPS All Asia Conference (ICEP-IAAC), Apr. 17-21, 2018.

Sasaki et al., Principle and Application of a Sensitive Handy Electrooptic Probe for Sub-100-MHz Frequency Range Signal Measurements, IEEE Transactions on Instrumentation and Measurement, vol. 57, Issue: 5, May 2008.

Amellal et al., "Effectiveness of quantum algorithms on classical computing complexities", SCA'18, Oct. 10-11, 2018, 3 Pages.

Amos et al., "One-shot signatures and applications to hybrid quantum/ classical authentication", STOC 2020: Proceedings of the 52nd Annual ACM SIGACT Symposium on Theory of Computing, Jun. 22, 2020, pp. 255-268.

Angara et al., "Hybrid quantum-classical problem solving in the NISQ era", GASCON '20: Proceedings of the 30th Annual International Conference on Computer Science and Software Engineering, Nov. 2020, pp. 247-252, https://dl.acm.org/doi/10.5555/3432601.3432634.

Briffaut, "Uncertainty in virtual collaborative contexts", https://ieeexplore.ieee.org/document/7461430, Jun. 22-24, 2009, 8 pages.

Chen et al., "A Quantum Feature Selection Algorithm for Multi-Classification Problem", 2019 International Conference on Internet of Things (iThings) and IEEE Green Computing and Communications (GreenCom) and IEEE Cyber, Physical and Social Computing (CPSCom) and IEEE Smart Data (SmartData), Jul. 14-17, 2019.

Disclosed Anonymously, IP.com No. IPCOM000255049D "Fit for Purpose Processing in the Quantum World", Aug. 28, 2018, 7 pages.

Disclosed Anonymously, IP.com No. IPCOM000261173D "System and Method to Assess Quantum Use Case Potential", Feb. 5, 2020, 5 Pages.

Disclosed Anonymously, IP.com No. IPCOM000261581D Quantum Developer Visualization Tool (QDVT), Mar. 18, 2020, 8 Pages.

Disclosed Anonymously, IP.com No. IPCOM000262775D "Quantum Affinity Assessment", Jun. 29, 2020, 11 pages.

Glover et al., "Quantum Bridge Analytics I: A Tutorial on Formulating and Using QUBO Models", https://arxiv.org/abs/1811.11538, 2019, 46 pages.

Hui-Huang Hsu, "Hybrid feature selection by combining filters and wrappers", Expert Systems with Applications 38, 2011, 8144-8150.

Kechrimparis et al., "Channel Coding of a Quantum Measurement", IEEE Journal on selected areas in communications, Mar. 2020, 10 pages, vol. 38, No. 3.

Khrennikova et al. "Asset Trading Under Non-Classical Ambiguity and Heterogeneous Beliefs", Physica A: Statistical Mechanics and its Applications, Jan. 15, 2019, pp. 562-577.

Kiefl et al., "Software Engineering Education of Classical Computing vs. Quantum Computing: A Competency-Centric Approach", ECSEE, Jun. 18, 2020, 5 pages.

Mabuchi et al., "Dynamical identification of open quantum systems", Quantam Semiclass, Jun. 14, 1996, 1103-1108.

Malinverni et al., "A conceptual framework to compare two paradigms of Augmented and Mixed Reality experiences", IDC, Jun. 19-22, 2018, 12 pages.

Molmer, "Quantum information tools", 2013 Conference on Lasers & Electro-Optics Europe & International Quantum Electronics Conference CLEO EUROPE/IQEC, May 12-16, 2013, https://ieeexplore.ieee.org/document/6801705, 1 page.

(56) References Cited

OTHER PUBLICATIONS

Nayak et al., "Limits on the ability of quantum states to convey classical messages", Journal of the ACM, Jan. 1, 2006, pp. 184-206, vol. 53, No. 1.

Ramos et al. "Quantum-inspired Evolutionary Algorithm for Feature Selection in Motor Imagery EEG Classification", IEEE Congress on Evolutionary Computation (CEC), Jul. 8-13, 2018, 8 pages.

Rojo et al., "Trials and Tribulations of Developing Hybrid Quantum-Classical Microservices Systems", arXiv:2105.04421 v1 [cs.SE] (Year: 2021).

Windridge et al. "Quantum Bootstrap Aggregation", International Symposium on Quantum Interaction, Springer, Cham, 2016, pp. 115-121.

Zhou et al., "Feature Selection based on OFT", Third International Conference on Natural Computation (ICNC 2007), Aug. 24-27, 2007, 5 pages.

Chakraborty et al. A hybrid quantum feature selection algorithm using a quantum inspired graph theoretic approach, Applied Intelligence, 2020, 19 pages.

Cremonesi et al. "Practical Quantum Computing: a Collaborative-Driven Quantum Feature Selection Approach for the Cold-Start Problem in Recommender Systems", Riccardo Nembrini, Politecnico di Milanom Master's Thesis, https://www.politesi.polimi.it/retrieve/8053bad3-90aa-4f2c-8ffb-eb942b50b58d/2020_10_Nembrini.pdf, 2019, 104 pages.

Farhi, et al., "A Quantum Approximate Optimization Algorithm", arXiv:1411.4028v1, Nov. 14, 2014, 16 pages.

\* cited by examiner

IDENTIFYING RELATED MESSAGES IN A NATURAL LANGUAGE INTERACTION IN MULTIPLE ITERATIONS

BACKGROUND

The present invention relates generally to a method, system, and computer program product for data attribute evaluation. More particularly, the present invention relates to a method, system, and computer program product for combined classical/quantum predictor evaluation in multiple iterations.

A predictor variable, or predictor, is a variable used to estimate or forecast a future event or outcome. For example, when evaluating computing resource configurations for deployment within a data center, example predictors might be the number of processors in each system, the speed of each processor, the network bandwidth available to each computing resource, and the amount of storage available to each computing resource, and the forecast outcome might be a data throughput of the entire data center once a particular resource configuration has been deployed. Data modelling often includes analyzing one or more predictors, as well as the relative weights of each predictor, to determine the strength and direction of a predictor's association with a particular outcome or criterion. Predictor valuation refers to valuing a predictor's ability to predict a desired outcome.

Hereinafter, a "Q" prefix in a word of phrase is indicative of a reference of that word or phrase in a quantum computing context unless expressly distinguished where used.

Nature—including molecules—follows the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a processor fabricated using semiconductor technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0) can depend on the state of another, and that there is more information that can be ascertained about the two qubits when they are entangled than when they are treated individually. Using these two principles, qubits operate as more sophisticated processors of information, enabling quantum computers to function in ways that allow them to solve difficult problems that are intractable using conventional computers. IBM has successfully constructed and demonstrated the operability of a quantum processor (IBM is a registered trademark of International Business Machines corporation in the United States and in other countries.)

SUMMARY

The illustrative embodiments provide a method, system, and computer program product. An embodiment includes a method that scores, using a classical data model executing on a classical processor, a set of classical features, a classical feature in the set of classical features comprising a first attribute of a resource, a score of the classical feature comprising an evaluation of a utility of the classical feature in predicting a result involving the resource. An embodiment scores, using a quantum data model executing on a quantum processor and the scored set of classical features, a set of quantum features, a quantum feature in the set of quantum features comprising a second attribute of the resource, a score of the quantum feature comprising an evaluation of a utility of the quantum feature in predicting the result, the quantum data model executed a number of times, the number of times previously determined using a set of results of executing the quantum data model on a set of annotated training data. An embodiment correlates, forming a combined set of scored features, the scored set of classical features and the scored set of quantum features. An embodiment calculates, using the combined set of scored features and a first set of input data of a resource, a valuation of the resource An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
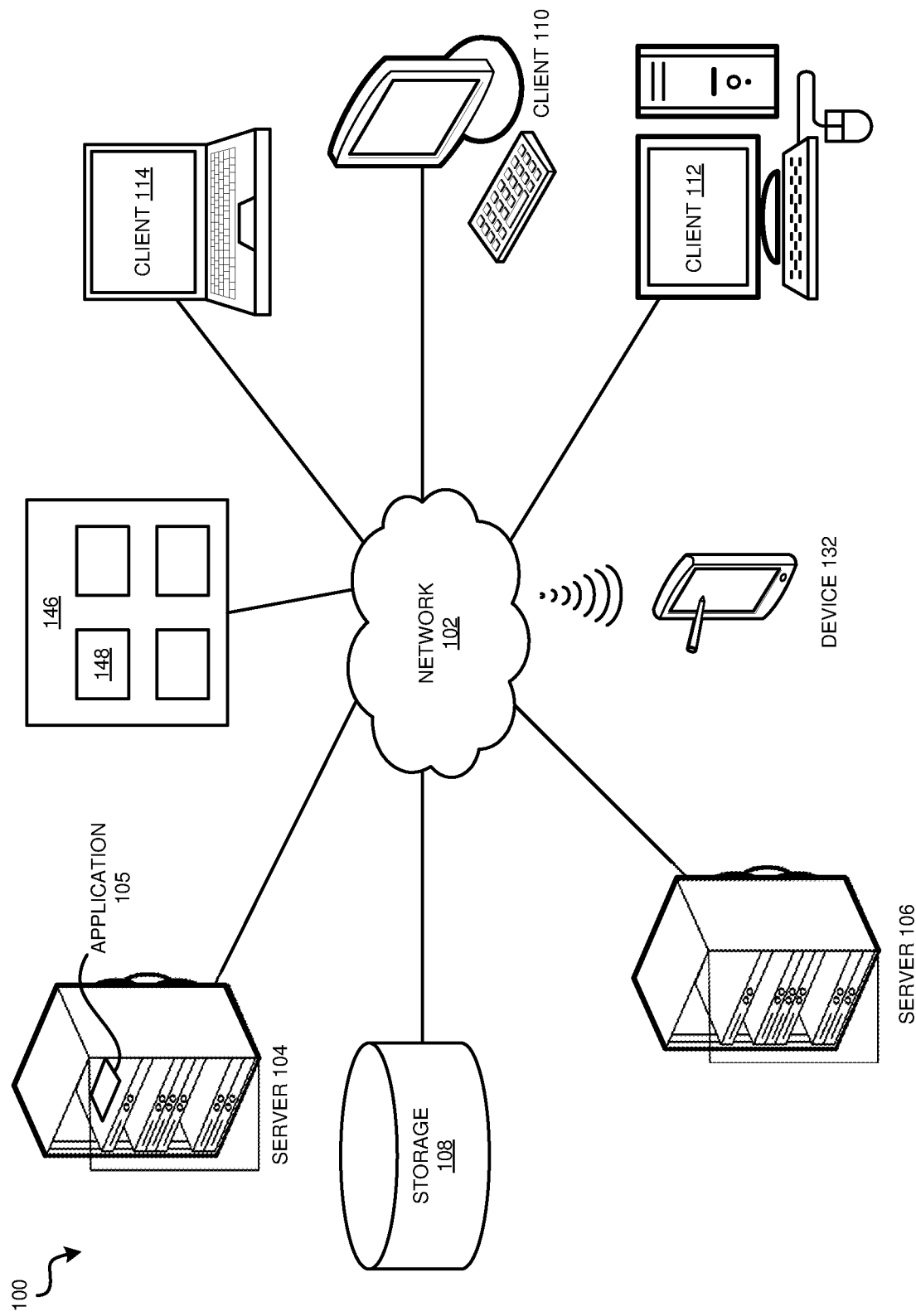
FIG. 1 depicts a block diagram of a network of data processing systems in which illustrative embodiments may be implemented.

The illustrative embodiments recognize that predictor valuation, and selection of the best (i.e. highest valued) predictors, determines the accuracy of the outcome the predictors predict. However, classical computing techniques for predictor valuation and selection, such as statistical analysis, predictive modeling, or a combination of classical approaches are insufficiently accurate, insufficiently personalizable to a specific user need, and fast enough to analyze data at the scale, volume, and velocity needed today. Thus, the illustrative embodiments recognize that there is an unmet need for predictor valuation that is more accurate and more quickly computable than the techniques currently available.

The illustrative embodiments recognize that the presently available tools or solutions do not address these needs or provide adequate solutions for these needs. The illustrative embodiments used to describe the invention generally address and solve the above-described problems and other problems related to combined classical/quantum predictor evaluation in multiple iterations.

An embodiment can be implemented as a software application. The application implementing an embodiment can be configured as a modification of an existing predictor evaluation or data modelling system, as a separate application that operates in conjunction with an existing predictor evaluation or data modelling system, a stand-alone application, or some combination thereof.

Particularly, some illustrative embodiments provide a method that scores a set of classical features using a classical data model executing on a classical processor, scores a set of quantum features using a quantum data model executing on a quantum processor and the scored set of classical features, correlates, forming a combined set of scored features, the scored set of classical features and the scored set of quantum features, and predicts, using the combined set of scored features and a first set of input data of a resource, a valuation of the resource.

An embodiment receives, as input, a set of data. In one embodiment, the data comprises a set of attribute-value pairs, in which the attribute labels or describes the data value. A data attribute is also referred to as a feature. For example, one attribute-value pair might have processor speed as the attribute and 2 GHz as the value. In another embodiment, the data comprises a stream, or set of values in order, labelled with the attribute. One non-limiting example of a stream is the output of a temperature measurement system, labelled with "temperature" and including a set of temperature measurement results obtained at one-hour intervals. The data may be historical, may be data of a currently occurring event, or a combination. An embodiment also receives, as input, a set of outcome data associated with the input, for use in model training and predictor evaluation. One or more data attributes are potential predictors.

An embodiment uses a classical data model executing on a classical processor to select and score a set of data attributes, or features, from input training data. One embodiment selects features to score using a set of heuristics. Another embodiment selects features to score using a set of analytical methods. Another embodiment selects features to score using an automated artificial intelligence tool, such as AutoAI. As well as feature selection, an embodiment fills in missing data for the selected features, scales feature data to a common scale, and performs other data cleanup for selected features and their data.

An embodiment selects a model type with which to analyze the input training data with respect to a feature being scored. One embodiment selects a model type based on a characteristic of the feature being scored. For example, if there are only two data values for an attribute, the embodiment selects a binary classification type model. As another example, if the attribute could have an unknowable set of possible values, the embodiment selects a regression type model. An embodiment recursively re-selects features and refines a selected model type and model weights and parameters until the model satisfies a completion criterion, such as optimizing accuracy, by obtaining a set of features that best predict a particular result. An embodiment uses a weight of a feature within the resulting model as the feature's score. Another embodiment selects and refines an ensemble of model types, adjusts each model in the ensemble's weights and parameters until each model satisfies a completion criterion, and combines the resulting weights from the different models into one score for a feature. The embodiment combines the resulting weights using any presently known weight-combining technique. Another embodiment scores features by multiplying a feature's weight by the absolute value of the Pearsons correlation coefficient, a presently known technique that measures the statistical relationship between two variables, providing information about the magnitude of the association between a predictor and a desired result. Another embodiment uses, instead of model weights, the output of a model's explainer module, which produces a score corresponding to an importance of a feature in predicting a desired result from that model. Different models' explainer module output can be compared to determine relative predictor importance between models. Another embodiment uses a presently known random forest technique to fit a random forest to input training data and scores features according to data fit. Other techniques for scoring predictors using a classical processor are also possible and contemplated within the scope of the illustrative embodiments.

An embodiment uses the feature scores to select a set of highest-scored, or best, features. One embodiment selects all features with scores above a threshold value. Another embodiment ranks features by their scores, then selects a predetermined number of the top-ranked features, for example the top ten or fifteen features. Another embodiment uses another feature selection method.

An embodiment uses a quantum data model executing on a quantum processor to select and score another set of data attributes, or features, from input training data. One embodiment starts with the top-ranked classical features (the features scored using the classical processor) and performs a presently known recursive feature elimination with cross validation (RFECV) technique on a support vector machine executing on a quantum processor (QSVM) to select and score a set of quantum features. A support-vector machine is a presently known supervised learning model with one or more associated learning algorithms that analyze data for classification and regression analysis. Another embodiment uses the top-ranked classical features to perform a quadratic unconstrained binary optimization (QUBO) technique and executes a quantum approximate optimization algorithm (QAOA) on a quantum processor to select and score a set of quantum features. QAOA is a presently known heuristic technique that transforms a simple many-qubit wave function into one which encodes the solution to an optimization problem. Both QSVM and QAOA include an explainer module, which produces a score corresponding to an importance of a feature in predicting a desired result. One embodiment applies the top-ranked classical features as quadratic penalties to force QUBO to find a different set of predictors as input to QAOA. Other techniques for scoring predictors using a quantum processor are also possible and contemplated within the scope of the illustrative embodiments.

A quantum data model executing on a quantum processor produces probabilistic results. In other words, if the model is executed multiple times with the same set of parameter values and initial conditions, model output will not be exactly the same after each execution. Instead, the set of model outputs forms a probability distribution. Thus, to improve accuracy in feature scoring, an embodiment performs multiple execution iterations of a quantum data model, and combines the results of the iterations into a set of feature scores using averaging or another presently known technique.

However, once a quantum model has been executed for a number of iterations, executing additional iterations is unlikely to further improve accuracy by a statistically significant amount, and executing unneeded additional iterations wastes time, quantum processing resources, and any costs associated with using the quantum processing resources. Thus, an embodiment uses an annotated set of training data to determine how many execution iterations of the quantum model are to be performed, and executes the quantum model for that number of iterations. In particular, an embodiment executes a quantum data model for different numbers of iterations to score data features from annotated training data in a manner described herein, then compares results of different numbers of iterations with a received annotation as to whether the scores were considered a good solution or not. One embodiment performs iterations until result accuracy no longer improves beyond a threshold amount, and the model is not overfit, and uses that number of iterations when using the model on non-training data. Another embodiment inputs sets of scores for a solution annotated as good into a multiple regression model, which outputs the number of iterations for which the quantum model should be executed when used on non-training data. Another embodiment uses another method to determine the number of iterations to use on non-training data.

An embodiment uses the feature scores scored by a quantum processor (the quantum features) to select a set of highest-scored, or best, quantum features. One embodiment selects all quantum features with scores above a threshold value. Another embodiment ranks quantum features by their scores, then selects a predetermined number of the top-ranked quantum features, for example the top ten or fifteen features. Another embodiment uses another quantum feature selection method.

An embodiment correlates the scored set of classical features and the scored set of quantum features into a combined set of scored features. One embodiment selects a set of features that are common to both the classical and quantum feature sets. Then, for a feature in the combined set, an embodiment multiples the feature's classical score (the score output using the classical processor) with the feature's quantum score (the score output using the quantum processor), including a scaling factor if necessary to normalize both scores to a common scale.

An embodiment uses the combined set of scored features and input data to calculate a valuation of a resource or predict an output value. One embodiment calculates a valuation of a resource by using a product sum of feature value and weight. For example, to evaluate a computing resource when configuring a computing system deployment, the combined set of scored features might indicate that processor speed and network bandwidth are the most important features in determining a computing resource's throughput, and that valuation is proportional to both processor speed and throughput. Thus, a resource having a processor speed of 2 GHz and a network bandwidth of 100 megabits per second might be half as valuable than a resource having a processor speed of 4 GHz and a network bandwidth of 200 megabits per second, and the higher-speed resource should be selected for the deployment instead of the lower-speed resource. As another example, to predict a height of a cloud layer above the ground, the combined set of scored features might indicate that temperature, atmospheric pressure, and dew point (the temperature below which water droplets begin to condense) are the most important features in determining a height of a cloud layer above the ground. Thus, given an atmospheric pressure of 1013 millibars, and a temperature and dew point of eight degrees Celsius each, an embodiment might predict that the cloud layer is zero meters above the ground (in other words, fog is forming or about to form). Note that these examples have been extremely simplified only for ease of illustration, and do not represent the complexity of actual data analysis implementations. Another embodiment uses the combined set of scored features and input data to calculate a valuation of a resource or predict an output value not globally, but in relation to other resources or values. For example, to evaluate a computing resource in relation to other resources when configuring a computing system deployment, one might want to assemble a set of differently-configured resources, such as some resources optimized for compute-intensive jobs and some resources optimized for network bandwidth-intensive jobs. One non-limiting example of a technique for calculating a valuation of a resource or predict an output value in relation to other resources or values uses Shapley values; other techniques are also presently known.

One embodiment uses the combined set of scored features and a single set of input data to calculate a valuation of a resource or predict an output value. For example, input data for valuing a computing resource might include the resource's processor speed and network bandwidth. Another embodiment uses the combined set of scored features and a stream of input data to generate a stream of valuations or predictions. For example, a cloud height prediction system might receive a stream of temperature, dew point, and pressure measurements, and output a corresponding stream of predictions. Time intervals of input and output streams need not be the same.

An embodiment uses a natural language processing system, the combined set of scored features, and the valuation or prediction to construct a natural language explanation of the valuation or prediction expressed in natural language form. For example, for the example computing resources described herein, an embodiment might construct a natural language explanation such as, "Because Resource A's processor speed of 2 GHz and network bandwidth of 100 megabits per second are half as useful than Resource B's processor speed of 4 GHz and network bandwidth of 200 megabits per second in the deployment you are configuring, I suggest deploying Resource B instead of Resource A." As another example, for the weather prediction described herein, an embodiment might construct a natural language explanation such as, "Because the temperature-dew point spread is currently zero, cloud height is also predicted to be zero meters above ground and fog is likely to form within the next hour."

Some predictors are better at predicting a short-term result than a longer-term result, and vice versa. For example, because cloud height is determined by current atmospheric conditions, the current temperature-dew point spread might be useful in predicting cloud height for the next hour or two, but unlikely to be as useful in predicting a cloud height for a day next week or next month. As another example, transactions on a shopping website might exhibit daily (e.g. less activity at 3 am in a particular time zone than at 8 pm) and seasonal (e.g. more activity during December than in July) variations, so time of day might be more useful in predicting the next hour's transaction load, and valuing a resource with which to handle that load, than next December's. Thus, one embodiment uses a classical data model executing on a classical processor to select and score two or more sets of features from input training data, with each set of features using a different time horizon. The embodiment uses the sets of feature scores to select a set of highest-scored, or best, features of each set for each time horizon, and uses a quantum data model executing on a quantum processor to select and score another two or more sets of features from input training data, with each set of quantum features using a different time horizon. For each time horizon, the embodiment correlates the scored sets of classical and quantum features into a combined set of scored features. The embodiment uses the combined set of scored features and input data to calculate a valuation of a resource or predict an output value for a particular time horizon in a manner described herein.

In addition, when an embodiment uses a quantum data model executing on a quantum processor to select and score another two or more sets of features from input training data, with each set of quantum features using a different time horizon, the embodiment determines a number of execution iterations of the quantum data model for each different time horizon. In particular, an embodiment trains a classification model to classify predictors into two or more different time horizons. One embodiment uses a long short term memory (LSTM) as the classification model; other classification models are also possible and contemplated within the scope of the illustrative embodiments. An embodiment determines the number of iterations for which the quantum model should be executed when used on non-training data in a manner described herein, inputting time horizon-specific sets of scores for a solution annotated as good for that time horizon into a multiple regression model used in a manner described herein.

The manner of combined classical/quantum predictor evaluation described herein is unavailable in the presently available methods in the technological field of endeavor pertaining to data modelling and prediction. A method of an embodiment described herein, when implemented to execute on a device or data processing system, comprises substantial advancement of the functionality of that device or data processing system in scoring a set of classical features using a classical data model executing on a classical processor, scoring a set of quantum features using a quantum data model executing on a quantum processor and the scored set of classical features, correlating, forming a combined set of scored features, the scored set of classical features and the scored set of quantum features, and predicting, using the combined set of scored features and a first set of input data of a resource, a valuation of the resource.

The illustrative embodiments are described with respect to certain types of input data, attributes, features, predictions, valuations, evaluations, models, forecasts, thresholds, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
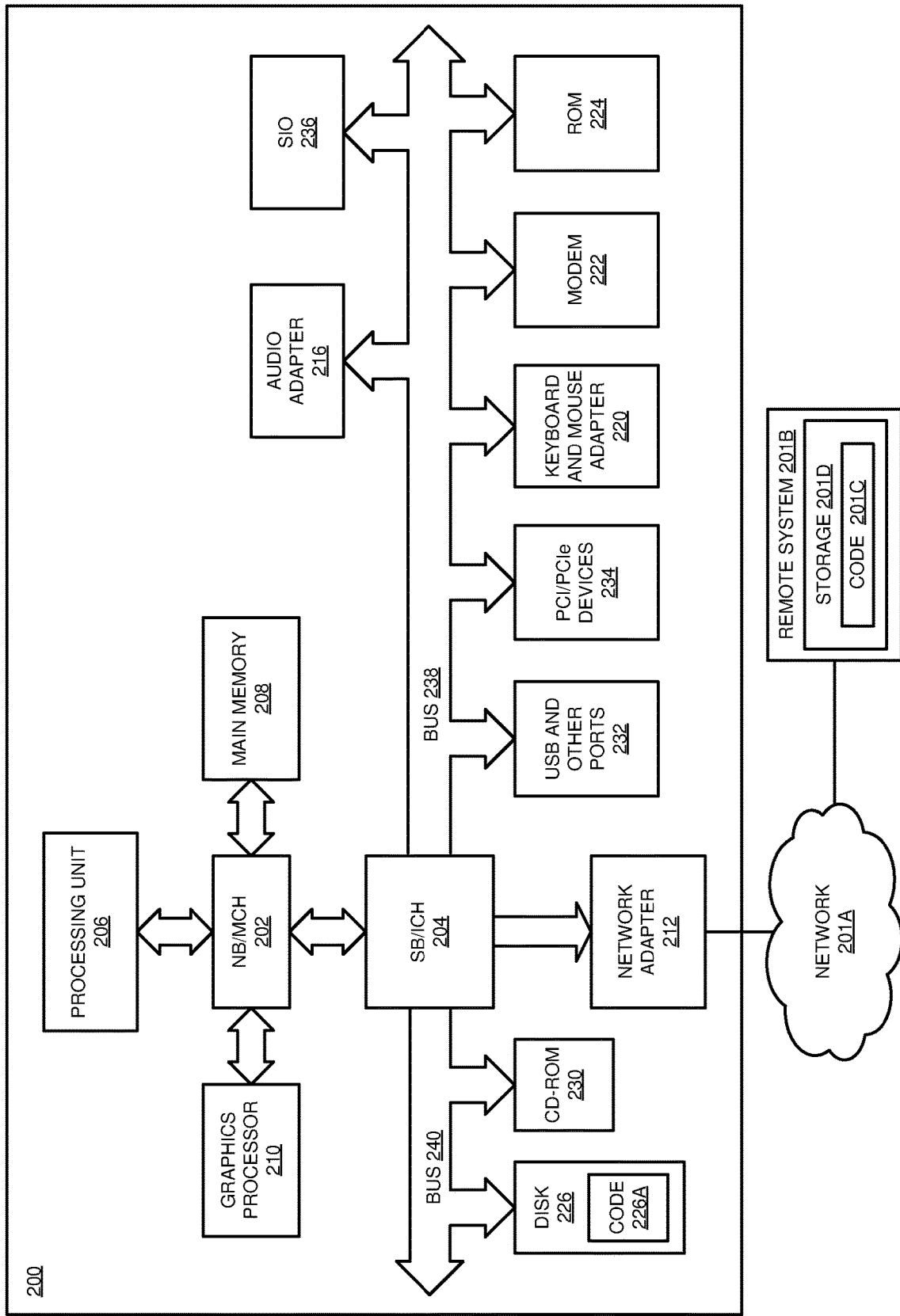
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment.

For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

A quantum computing device 146 comprises one or more q-processors 148. A currently viable qubit is an example of q-processor 148. Quantum computing device 148 may couple to network 102 using wired connections, wireless communication protocols, or other suitable data connectivity.

Application 105 implements an embodiment described herein. Application 105 executes partially in any of servers 104 and 106, clients 110, 112, and 114, and device 132, and partially in quantum computing device 148.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system.

Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
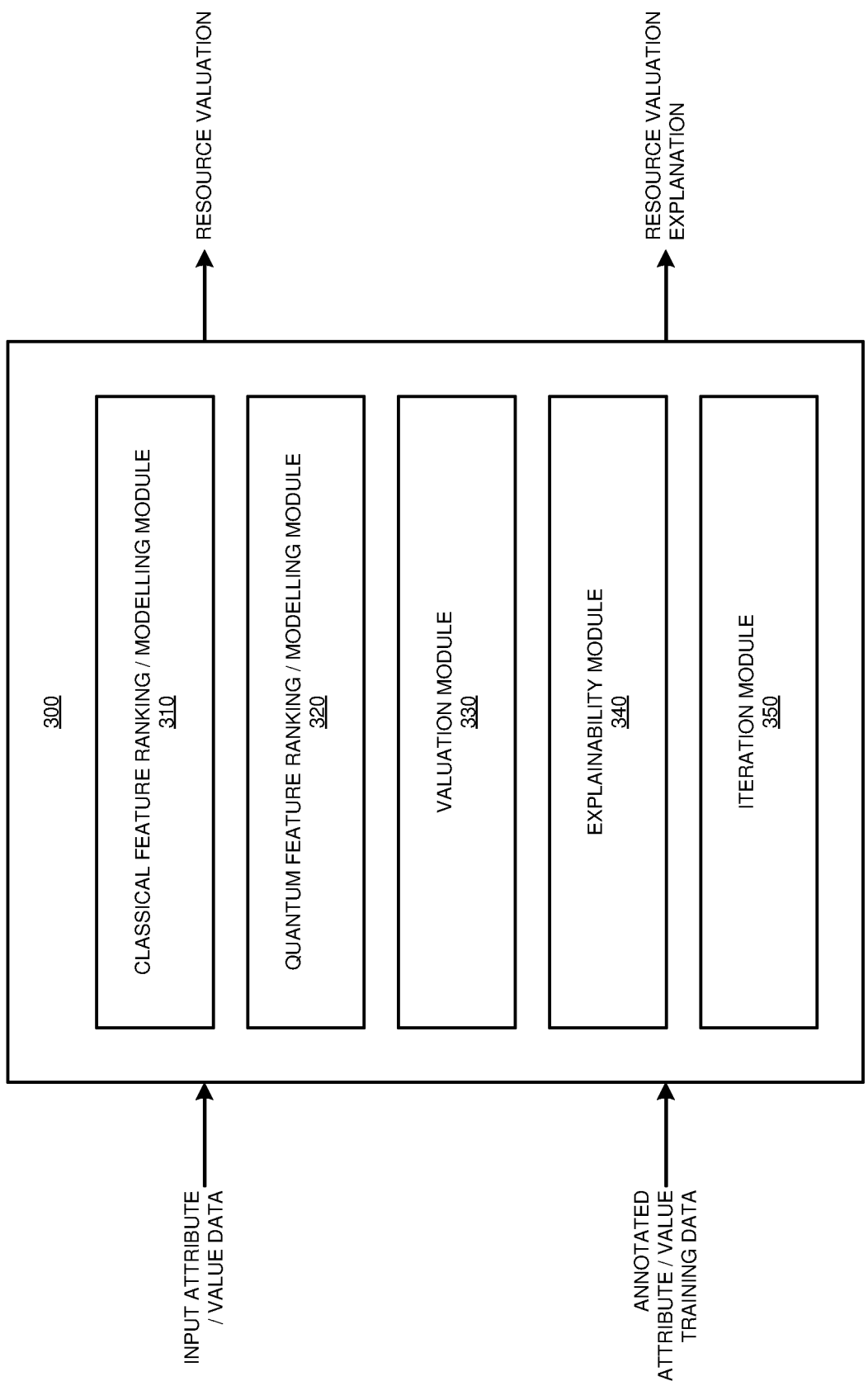
FIG. 3 depicts a block diagram of an example configuration for combined classical/quantum predictor evaluation in multiple iterations in accordance with an illustrative embodiment.

With reference to FIG. 3, this figure depicts a block diagram of an example configuration for combined classical/quantum predictor evaluation in multiple iterations in accordance with an illustrative embodiment. Application 300 is an example of application 105 in FIG. 1 and executes partially in any of servers 104 and 106, clients 110, 112, and 114, and device 132, and partially in quantum computing device 148 in FIG. 1.

Application 300 receives, as input, a set of data comprises a set of attribute-value pairs, in which the attribute labels or describes the data value, or a stream, or set of values in order, labelled with the attribute. Application also receives, as input, a set of outcome data associated with the input, for use in model training and predictor evaluation.

Classical feature ranking/modelling module 310 uses a classical data model executing on a classical processor to select and score a set of data attributes, or features, from input training data. One implementation of module 310 selects features to score using a set of heuristics. Another implementation of module 310 selects features to score using a set of analytical methods. Another implementation of module 310 selects features to score using an automated artificial intelligence tool, such as AutoAI. As well as feature selection, module 310 fills in missing data for the selected features, scales feature data to a common scale, and performs other data cleanup for selected features and their data.

Module 310 selects a model type with which to analyze the input training data with respect to a feature being scored. One implementation of module 310 selects a model type based on a characteristic of the feature being scored, such as a binary classification type model or a regression type model. Module 310 recursively re-selects features and refines a selected model type and model weights and parameters until it satisfies a completion criterion, such as optimizing accuracy, by obtaining a set of features that best predict a particular result. Module 310 uses a weight of a feature within the resulting model as the feature's score. Another implementation of module 310 selects and refines an ensemble of model types, adjusts each model in the ensemble's weights and parameters until each model satisfies a completion criterion, and combines the resulting weights from the different models into one score for a feature. The implementation combines the resulting weights using any presently known weight-combining technique. Another implementation of module 310 scores features by multiplying a feature's weight by the absolute value of the Pearsons correlation coefficient. Another implementation of module 310 uses, instead of model weights, the output of a model's explainer module, which produces a score corresponding to an importance of a feature in predicting a desired result. Another implementation of module 310 uses a presently known random forest technique to fit a random forest to input training data and scores features according to data fit. Other implementation of module 310 use other presently known techniques for scoring predictors using a classical processor.

Module 310 uses the feature scores to select a set of highest-scored, or best, features. One implementation of module 310 selects all features with scores above a threshold value. Another implementation of module 310 ranks features by their scores, then selects a predetermined number of the top-ranked features, for example the top ten or fifteen features. Another implementation of module 310 uses another feature selection method.

Quantum feature ranking/modelling module 320 uses a quantum data model executing on a quantum processor to select and score another set of data attributes, or features, from input training data. One implementation of module 320 starts with the top-ranked classical features (the features scored using the classical processor) and performs an RFECV technique on a QSVM to select and score a set of quantum features. Another implementation of module 320 uses the top-ranked classical features to perform a QUBO technique and executes a QAOA on a quantum processor to select and score a set of quantum features. Both QSVM and QAOA include an explainer module, which produces a score corresponding to an importance of a feature in predicting a desired result. One implementation of module 320 applies the top-ranked classical features as quadratic penalties to force QUBO to find a different set of predictors as input to QAOA. Other implementations of module 320 use other presently known techniques for scoring predictors using a quantum processor.

To improve accuracy in feature scoring, module 320 performs multiple execution iterations of a quantum data model, and combines the results of the iterations into a set of feature scores using averaging or another presently known technique. Iteration module 350 uses an annotated set of training data to determine how many execution iterations of the quantum model are to be performed, and module 320 executes the quantum model for that number of iterations. In particular, module 320 executes a quantum data model for different numbers of iterations to score data features from annotated training data in a manner described herein, then module 350 compares results of different numbers of iterations with a received annotation as to whether the scores were considered a good solution or not. One implementation of module 350 performs iterations until result accuracy no longer improves beyond a threshold amount, and the model is not overfit, and uses that number of iterations when using the model on non-training data. Another implementation of module 350 inputs sets of scores for a solution annotated as good into a multiple regression model, which outputs the number of iterations for which the quantum model should be executed when used on non-training data.

Module 320 uses the feature scores scored by a quantum processor (the quantum features) to select a set of highest-scored, or best, quantum features. One implementation of module 320 selects all quantum features with scores above a threshold value. Another implementation of module 320 ranks quantum features by their scores, then selects a predetermined number of the top-ranked quantum features, for example the top ten or fifteen features. Another implementation of module 320 uses another quantum feature selection method.

Valuation module 330 correlates the scored set of classical features and the scored set of quantum features into a combined set of scored features. In particular, module 330 selects a set of features that are common to both the classical and quantum feature sets. Then, for a feature in the combined set, module 330 multiples the feature's classical score (the score output using the classical processor) with the feature's quantum score (the score output using the quantum processor), including a scaling factor if necessary to normalize both scores to a common scale.

Module 330 uses the combined set of scored features and input data to calculate a valuation of a resource by using a product sum of feature value and weight. One implementation of module 330 uses the combined set of scored features and a single set of input data to predict a valuation of a resource or predict an output value. Another implementation of module 330 uses the combined set of scored features and a stream of input data to generate a stream of valuations or predictions. Time intervals of input and output streams need not be the same.

Explainability module 340 uses a natural language processing system, the combined set of scored features, and the valuation or prediction to construct a natural language explanation of the valuation or prediction expressed in natural language form.

Figure 4:
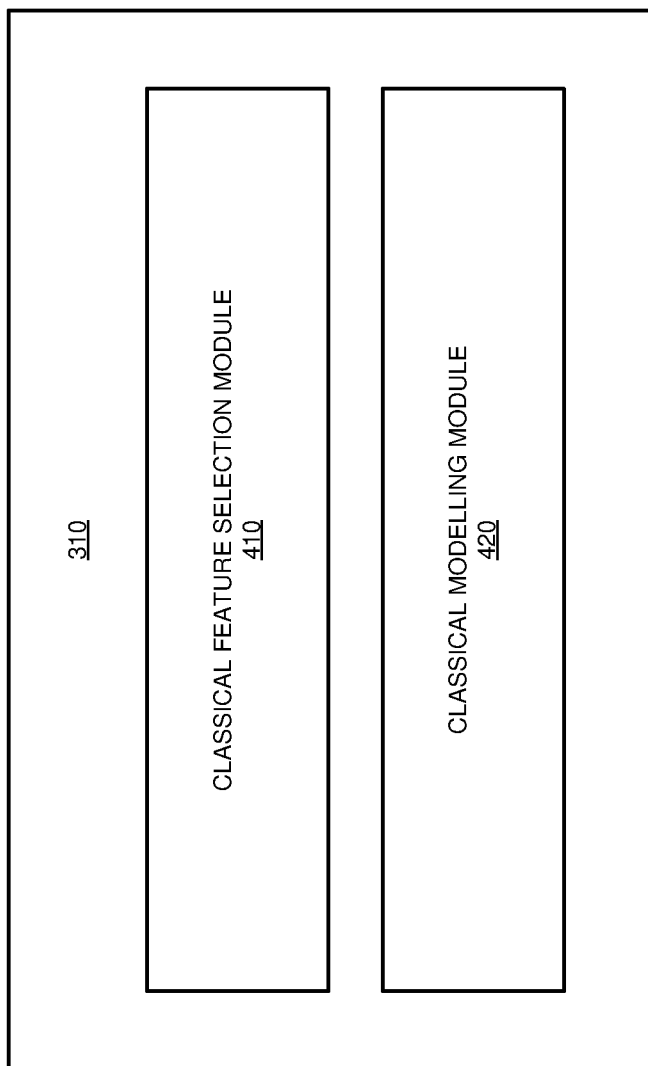
FIG. 4 depicts a block diagram of an example configuration for combined classical/quantum predictor evaluation in multiple iterations in accordance with an illustrative embodiment.

With reference to FIG. 4, this figure depicts a block diagram of an example configuration for combined classical/quantum predictor evaluation in multiple iterations in accordance with an illustrative embodiment. Module 310 is the same as module 310 in FIG. 3. In particular, FIG. 4 depicts more detail of module 310 in FIG. 3.

Classical feature selection module 410 uses a classical data model executing on a classical processor to select a set of features, using one or more of using a set of heuristics, a set of analytical methods, an automated artificial intelligence tool such as AutoAI. Classical modelling module 420 selects a model type with which to analyze the input training data with respect to a feature being scored, or selects an ensemble of model types. Modules 410 and 420 recursively refine model parameters until a model or ensemble of models satisfy a completion criterion, obtaining a set of features that best predict a particular result.

Figure 5:
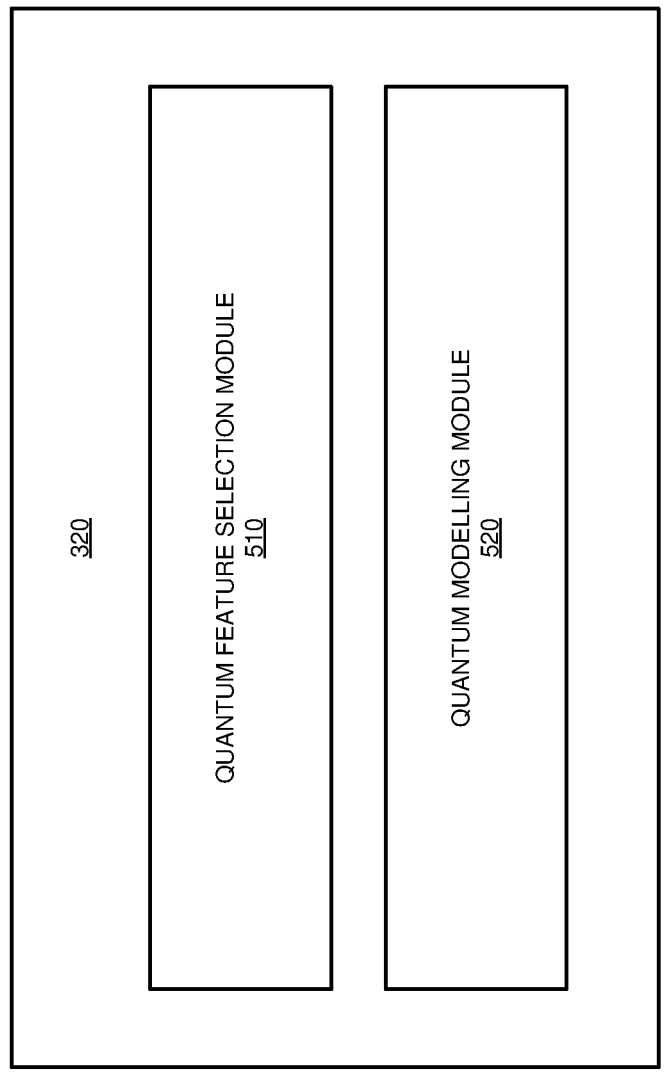
FIG. 5 depicts a block diagram of an example configuration for combined classical/quantum predictor evaluation in multiple iterations in accordance with an illustrative embodiment.

With reference to FIG. 5, this figure depicts a block diagram of an example configuration for combined classical/quantum predictor evaluation in multiple iterations in accordance with an illustrative embodiment. Module 320 is the same as module 320 in FIG. 3. In particular, FIG. 5 depicts more detail of module 320 in FIG. 3.

In one implementation of module 320, quantum feature selection module 510 performs RFECV on a QSVM implemented by quantum modelling module 520 to select and score a set of quantum features. In another implementation of module 320, module 510 uses the top-ranked classical features to perform a QUBO technique and executes a QAOA implemented by quantum modelling module 520 to select and score a set of quantum features. One implementation of module 510 applies the top-ranked classical features as quadratic penalties to force QUBO to find a different set of predictors as input to module 520.

Figure 6:
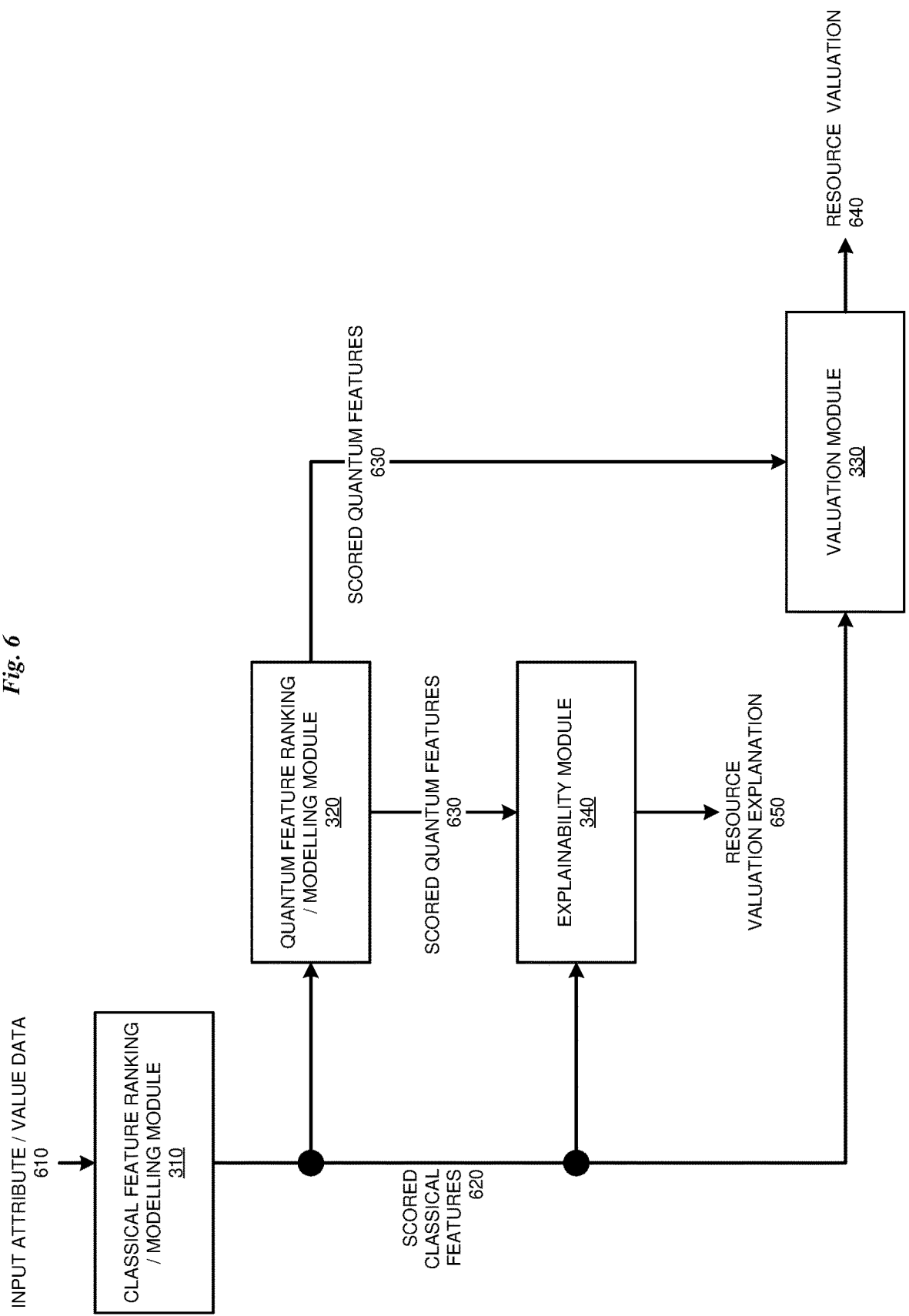
FIG. 6 depicts an example of combined classical/quantum predictor evaluation in multiple iterations in accordance with an illustrative embodiment.

With reference to FIG. 6, this figure depicts an example of combined classical/quantum predictor evaluation in multiple iterations in accordance with an illustrative embodiment. The example can be executed using application 300 in FIG. 3, partially in any of servers 104 and 106, clients 110, 112, and 114, and device 132, and partially in quantum computing device 148 in FIG. 1. Classical feature ranking/modelling module 310, quantum feature ranking/modelling module 320, valuation module 330, and explainability module 340 are the same as classical feature ranking/modelling module 310, quantum feature ranking/modelling module 320, valuation module 330, and explainability module 340 in FIG. 3.

Module 310 receives, as input, input attribute/value data 610, and uses a classical processor to generate scored classical features 620. Module 320 uses input attribute/value data 610, scored classical features 620 and a quantum processer to generate scored quantum features 630. Module 330 uses scored classical features 620 and scored quantum features 630 to generate resource valuation 640. Module 340 uses scored classical features 620 and scored quantum features 630 to generate resource valuation explanation 650.

Figure 7:
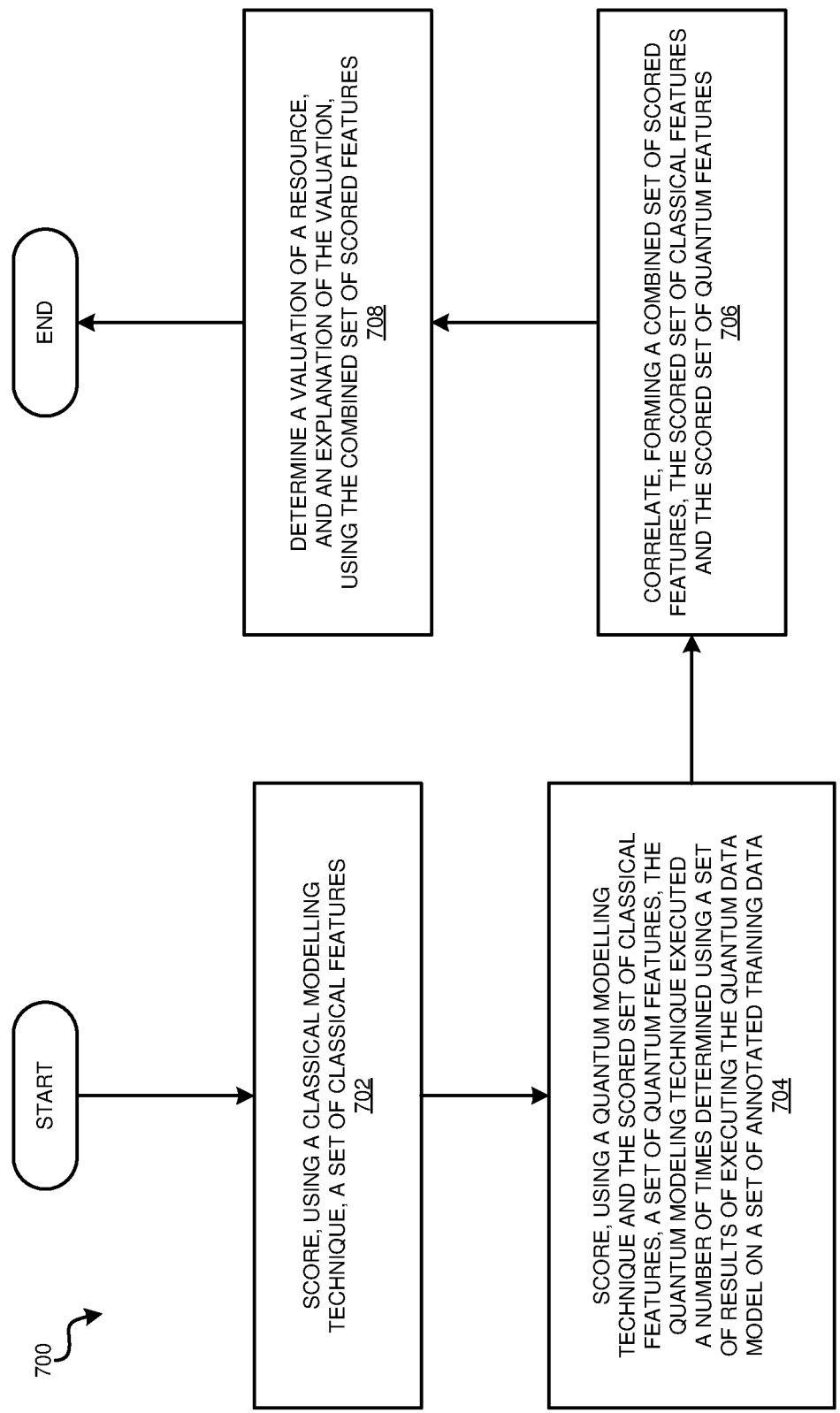
FIG. 7 depicts a flowchart of an example process for combined classical/quantum predictor evaluation in multiple iterations in accordance with an illustrative embodiment.

With reference to FIG. 7, this figure depicts a flowchart of an example process for combined classical/quantum predictor evaluation in multiple iterations in accordance with an illustrative embodiment. Process 700 can be implemented in application 300 in FIG. 3.

In block 702, the application scores, using a classical modelling technique, a set of classical features. In block 704, the application scores, using a quantum modelling technique and the scored set of classical features, a set of quantum features, the quantum modelling technique executed a number of times determined using a set of results of executing the quantum data model on a set of annotated training data. In block 706, the application correlates, forming a combined set of scored features, the scored set of classical features and the scored set of quantum features. In block 708, the application determines a valuation of a resource, and an explanation of the valuation, using the combined set of scored features. Then the application ends.

Figure 8:
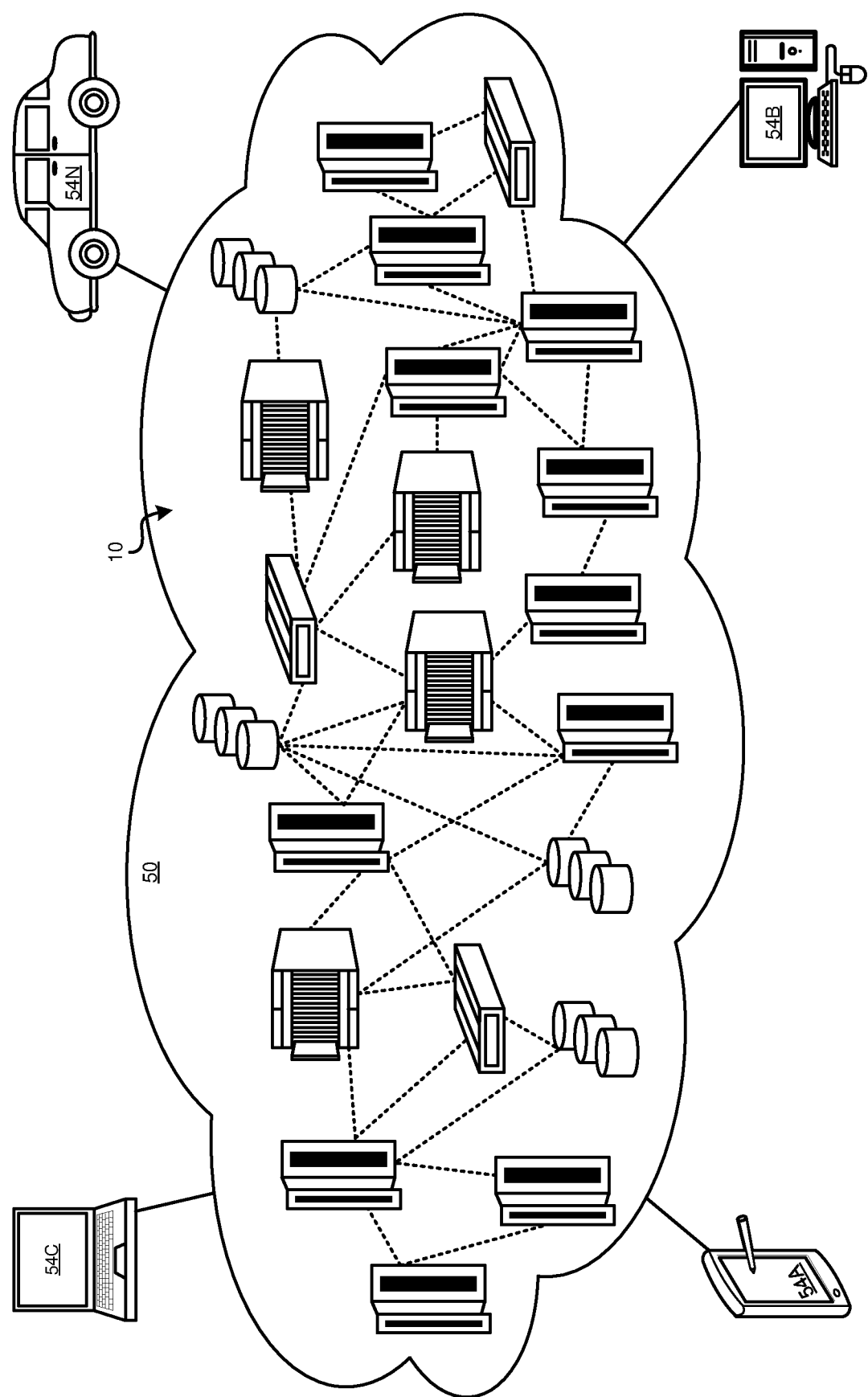
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
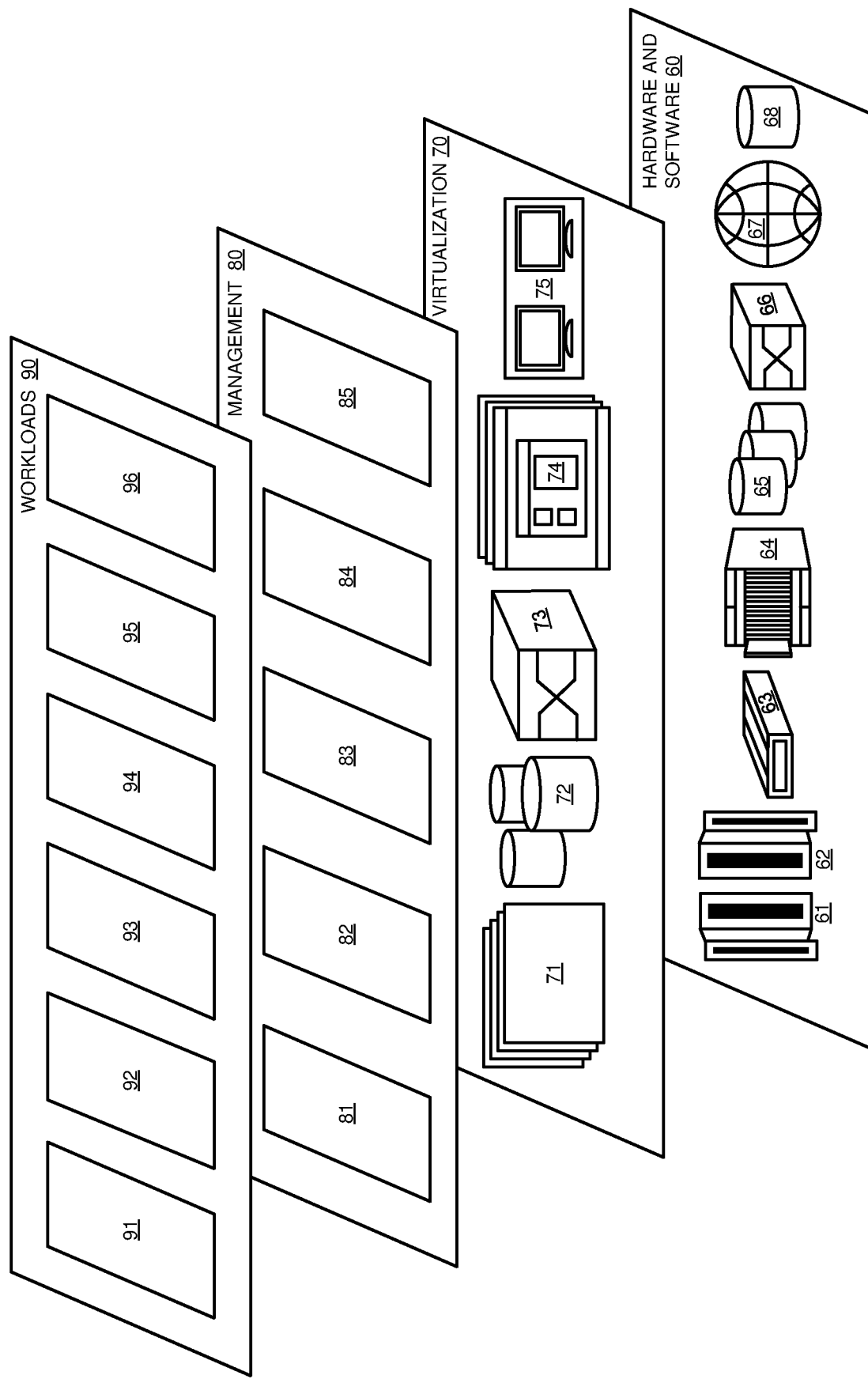
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for combined classical/quantum predictor evaluation in multiple iterations and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
scoring, using a classical data model executing on a classical processor, a set of classical features, a classical feature in the set of classical features comprising a first attribute of a resource, a score of the classical feature comprising an evaluation of a utility of the classical feature in predicting a result involving the resource;
scoring, using a quantum data model executing on a quantum processor and the scored set of classical features, a set of quantum features, a quantum feature in the set of quantum features comprising a second attribute of the resource, a score of the quantum feature comprising an evaluation of a utility of the quantum feature in predicting the result, the quantum data model executed a number of times, the number of times previously determined using a set of results of executing the quantum data model on a set of annotated training data,
wherein scoring the quantum feature utilizes one of a Quantum Support Vector Machine (QSVM) and Quantum Approximate Optimization Algorithm (QAOA);
forming a combined set of scored features by correlating common features of the scored set of classical features and the scored set of quantum features; and
calculating, using the combined set of scored features and a first set of input data of a resource, a valuation of the resource.

2. The computer-implemented method of claim 1, further comprising:
scoring, for a set of iterations of the quantum data model, a set of training quantum features, a training quantum feature in the set of training quantum features comprising a training attribute of the resource, a score of the training quantum feature comprising an evaluation of a utility of the training quantum feature in predicting a training result from the set of annotated training data, the annotated training data comprising a score quality annotation; and
determining, using the scored sets of training quantum features and a number of iterations used to obtain each of the scored sets of training quantum features, the number of times.

3. The computer-implemented method of claim 1, further comprising:
constructing, using a natural language processing system, the combined set of scored features, and the valuation, a natural language explanation of the valuation, the natural language explanation expressed in natural language form.

4. The computer-implemented method of claim 1, further comprising:
configuring, according to the valuation, a computing system deployment, the computing system deployment including the resource.

5. The computer-implemented method of claim 1, wherein the valuation of the resource comprises a valuation of the resource relative to a set of differently-configured resources.

6. The computer-implemented method of claim 5, further comprising:
configuring, according to the valuation, a computing system deployment, the computing system deployment including the resource and the set of differently-configured resources.

7. A computer program product for predictor evaluation, the computer program product comprising:
one or more computer readable storage media, and program instructions collectively stored on the one or more computer readable storage media, the stored program instructions comprising:
program instructions to score, using a classical data model executing on a classical processor, a set of classical features, a classical feature in the set of classical features comprising a first attribute of a resource, a score of the classical feature comprising an evaluation of a utility of the classical feature in predicting a result involving the resource;
program instructions to score, using a quantum data model executing on a quantum processor and the scored set of classical features, a set of quantum features, a quantum feature in the set of quantum features comprising a second attribute of the resource, a score of the quantum feature comprising an evaluation of a utility of the quantum feature in predicting the result, the quantum data model executed a number of times, the number of times previously determined using a set of results of executing the quantum data model on a set of annotated training data,
wherein scoring the quantum feature utilizes one of a Quantum Support Vector Machine (QSVM) and Quantum Approximate Optimization Algorithm (QAOA);
program instructions to form a combined set of scored features by correlating common features of the scored set of classical features and the scored set of quantum features; and
program instructions to calculate, using the combined set of scored features and a first set of input data of a resource, a valuation of the resource.

8. The computer program product of claim 7, the stored program instructions further comprising:
program instructions to score, for a set of iterations of the quantum data model, a set of training quantum features, a training quantum feature in the set of training quantum features comprising a training attribute of the resource, a score of the training quantum feature comprising an evaluation of a utility of the training quantum feature in predicting a training result from the set of annotated training data, the annotated training data comprising a score quality annotation; and
program instructions to determine, using the scored sets of training quantum features and a number of iterations used to obtain each of the scored sets of training quantum features, the number of times.

9. The computer program product of claim 7, the stored program instructions further comprising:
program instructions to construct, using a natural language processing system, the combined set of scored features, and the valuation, a natural language explanation of the valuation, the natural language explanation expressed in natural language form.

10. The computer program product of claim 7, the stored program instructions further comprising:
program instructions to configure, according to the valuation, a computing system deployment, the computing system deployment including the resource.

11. The computer program product of claim 7, wherein the valuation of the resource comprises a valuation of the resource relative to a set of differently-configured resources.

12. The computer program product of claim 11, the stored program instructions further comprising:
program instructions to configure, according to the valuation, a computing system deployment, the computing system deployment including the resource and the set of differently-configured resources.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to score, using a classical data model executing on a classical processor, a set of classical features, a classical feature in the set of classical features comprising a first attribute of a resource, a score of the classical feature comprising an evaluation of a utility of the classical feature in predicting a result involving the resource;

program instructions to score, using a quantum data model executing on a quantum processor and the scored set of classical features, a set of quantum features, a quantum feature in the set of quantum features comprising a second attribute of the resource, a score of the quantum feature comprising an evaluation of a utility of the quantum feature in predicting the result, the quantum data model executed a number of times, the number of times previously determined using a set of results of executing the quantum data model on a set of annotated training data, wherein scoring the quantum feature utilizes one of a Quantum Support Vector Machine (QSVM) and Quantum Approximate Optimization Algorithm (QAOA);

program instructions to form a combined set of scored features by correlating common features of the scored set of classical features and the scored set of quantum features; and program instructions to calculate, using the combined set of scored features and a first set of input data of a resource, a valuation of the resource.

17. The computer system of claim 16, the stored program instructions further comprising:

program instructions to score, for a set of iterations of the quantum data model, a set of training quantum features, a training quantum feature in the set of training quantum features comprising a training attribute of the resource, a score of the training quantum feature comprising an evaluation of a utility of the training quantum feature in predicting a training result from the set of annotated training data, the annotated training data comprising a score quality annotation; and program instructions to determine, using the scored sets of training quantum features and a number of iterations used to obtain each of the scored sets of training quantum features, the number of times.

18. The computer system of claim 16, the stored program instructions further comprising:

program instructions to construct, using a natural language processing system, the combined set of scored features, and the valuation, a natural language explanation of the valuation, the natural language explanation expressed in natural language form.

19. The computer system of claim 16, the stored program instructions further comprising:

program instructions to configure, according to the valuation, a computing system deployment, the computing system deployment including the resource.

20. The computer system of claim 16, wherein the valuation of the resource comprises a valuation of the resource relative to a set of differently-configured resources.

\* \* \* \* \*